United States Patent [19]
Ono

[11] Patent Number: 5,387,853
[45] Date of Patent: Feb. 7, 1995

[54] AUTOMATIC TRAVELLING SYSTEM OF CONSTRUCTION VEHICLE

[76] Inventor: Toyoichi Ono, 688-5, Tokunobu, Hiratsuka-shi, Kanagawa-ken, Japan

[21] Appl. No.: 53,400

[22] Filed: Apr. 28, 1993

Related U.S. Application Data

[63] Continuation of Ser. No. 474,785, filed as PCT/JP88/00994, Sep. 29, 1988, Pat. No. 5,239,249.

[30] Foreign Application Priority Data

Sep. 30, 1987 [JP] Japan .................................. 62-244387

[51] Int. Cl.⁶ .................................................. G05D 1/12
[52] U.S. Cl. .......................................... 318/587; 318/139; 318/568.12; 180/169; 364/424.02
[58] Field of Search ...................... 318/139, 560–590; 364/424.02; 180/167–168; 901/1, 3, 9

[56] References Cited

U.S. PATENT DOCUMENTS

| | | | |
|---|---|---|---|
| 3,669,206 | 6/1972 | Tax et al. | 180/98 |
| 3,971,025 | 7/1976 | Levine . | |
| 4,049,961 | 9/1977 | Marcy . | |
| 4,099,591 | 7/1978 | Carr . | |
| 4,139,071 | 2/1979 | Tackett | 180/2 R |
| 4,278,142 | 7/1981 | Kono | 180/168 |
| 4,593,238 | 6/1986 | Yamamoto . | |
| 4,593,239 | 6/1986 | Yamamoto . | |
| 4,600,999 | 7/1986 | Ito et al. | 318/587 |
| 4,658,385 | 4/1987 | Tsuji | 901/1 |
| 4,664,590 | 5/1987 | Mackawa | 901/1 |
| 4,665,487 | 5/1987 | Ogawa et al. | 318/587 |
| 4,674,048 | 6/1987 | Okumura | 318/587 |
| 4,700,301 | 10/1987 | Dyke . | |
| 4,700,427 | 10/1987 | Knepper . | |
| 4,703,240 | 10/1987 | Yoshimoto et al. . | |
| 4,706,773 | 11/1987 | Reinaud . | |
| 4,716,530 | 12/1987 | Ogawa et al. | 364/424 |
| 4,729,660 | 3/1988 | Tsumura et al. . | |
| 4,736,812 | 4/1988 | Livneh | 180/168 |
| 4,772,832 | 9/1988 | Okazaki et al. | 318/587 |
| 4,773,018 | 9/1988 | Lundstrom . | |
| 4,780,817 | 10/1988 | Lofgren | 364/424.01 |
| 4,790,402 | 12/1988 | Field et al. . | |
| 4,796,198 | 1/1989 | Boultinghouse et al. . | |
| 4,811,229 | 3/1989 | Wilson . | |
| 4,817,750 | 4/1989 | Ishida et al. | 180/168 |
| 4,846,297 | 7/1989 | Field et al. . | |
| 4,858,132 | 8/1989 | Holmquist . | |
| 4,878,003 | 10/1989 | Knepper | 318/587 |
| 4,956,777 | 9/1990 | Cearley et al. | 364/424.02 |

FOREIGN PATENT DOCUMENTS 52-53332  4/1977  Japan .
52-21672  6/1977  Japan .
54-90593  6/1979  Japan .

OTHER PUBLICATIONS

International Search Report, PCT/JP88/00994, Oct., 1988.
International Preliminary Examination Report, PCTJP/88/00994, Sep., 1988.

*Primary Examiner*—Paul Ip
*Attorney, Agent, or Firm*—Vorys, Sater, Seymour & Pease

[57] ABSTRACT

An automatic travelling system of a construction vehicle for the purpose of remarkably decreasing the number of guide lines laid to reduce the installation cost and making the guiding operation of a vehicle accurate and easy. The automatic travelling system of a construction vehicle comprises a plurality of guide lines (L, 9 or l) serving as a main traveling path means for a vehicle (V or 22) and disposed on a traveling road surface for the vehicle disposed between a raw material site (1) and raw material depots (6a–6e) of a plant (5); and a plurality of detectors (D, 23 or 34) provided on the vehicle so as to detect the guide lines. Each of the guide lines is a guide cable or a laser beam.

17 Claims, 6 Drawing Sheets

AUTOMATIC TRAVELLING SYSTEM OF CONSTRUCTION VEHICLE

This is a continuation of co-pending application Ser. No. 07/474,785 filed as PCT/JP88/00994, Sep. 29, 1988, U.S. Pat. No. 5,239,249.

TECHNICAL FIELD

The present invention relates to an automatic travelling system of a construction vehicle for transporting raw materials from a raw material site storing sand, gravel, ore, etc. to raw material depots of a plant producing ready-mixed concrete, crushed stones, or the like.

BACKGROUND ART

Figure 1:
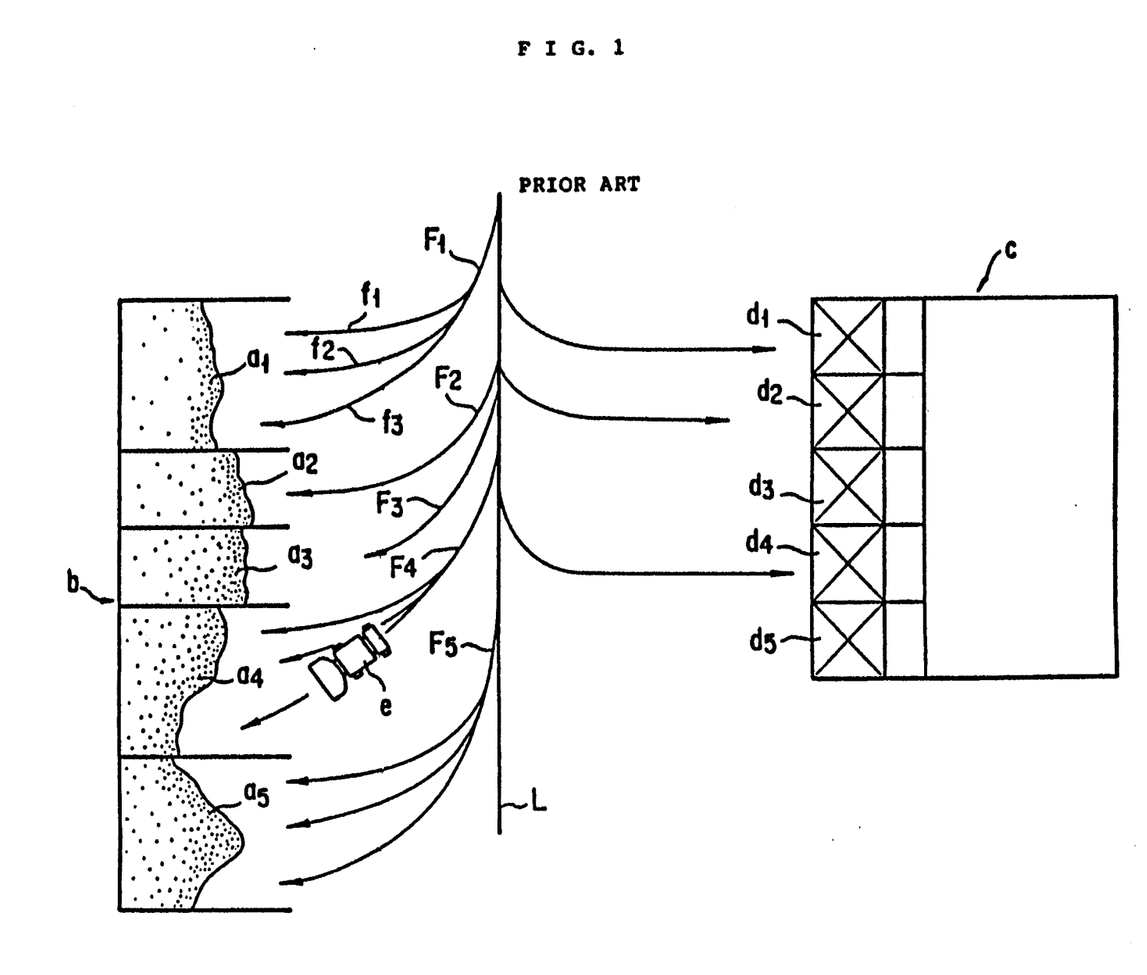
FIG. 1 is a schematic top plan view illustrating a conventional automatic travelling system of a construction vehicle applied to a plant site.

Generally, as shown in FIG. 1, in a plant producing ready-mixed concrete, crushed stones, or the like, raw materials $a_1$–$a_5$ such as sand, ore, and the like are transported from a raw material site b to raw material depots $d_1$–$d_5$ of a plant c by means of a construction vehicle e.

Such a transporting operation is usually performed by an operator by running the construction vehicle e.

However, there are many cases where the operator's field of view is poor due to an operation at night, smog, or the like. In addition, the operator must often carry out the operation in a deteriorated environment where noise is intense or the place is heavily dusty, and although a simple loading, travelling and unloading operation is involved, the operation is very severe for the operator. Furthermore, there has been a demand for automatically travelling construction vehicles due to the frequent occurrence of labor accidents, a shortage of skilled workers, and an increasing number of higher-age workers.

In view of this situation, as disclosed in, for instance, Japanese Patent Laid-Open No. 100574/1978, an automatic travelling system of a construction vehicle is known in which guide lines are laid on a travelling road surface leading from a raw material site to raw material depots of a plant, and a guide signal detector is provided on a construction vehicle such as a dump truck, allowing the construction vehicle to travel automatically without being manned.

With this conventional system, since the dump truck always travel along a guide line while detecting the guide line by means of a guide signal detector disposed at a predetermined position, in order to change the travelling direction, it is necessary to separately provide a travelling direction changing-over means, and it is necessary to lay guide lines on all the predetermined travelling paths. For this reason, the number of guide lines increases, and the installation cost becomes high.

In particular, in cases where such a conventional system is applied to the aforementioned travelling system of a construction vehicle in a plant, as shown in FIG. 1, it is necessary to lay guide lines $F_1$–$F_5$ on travelling road surfaces leading, for instance, from a main guide line L to each raw material $a_1$–$a_5$, and in order to collect a raw material which is laid in a wide space, such as the raw material $a1$, it is necessary to lay auxiliary guide lines $f_1$–$f_3$ branching from the guide line F1. Accordingly, since it is necessary to lay a multiplicity of guide lines on the vehicle-travelling road surface connecting the raw material site and the raw material depots $d_1$–$d_5$, the installation cost increases remarkably, and the guiding operation is complicated, making it impossible to obtain desired guiding accuracy. Additionally, there is a drawback in that the place where the guide lines are laid is restricted.

DISCLOSURE OF INVENTION

The present invention has been devised in view of the above-described situation in the conventional art, and its primary object is to provide an automatic travelling system of a construction vehicle in which the number of guide lines laid is remarkably decreased to reduce the installation cost and make the guiding operation of the vehicle accurate and easy.

A second object of the present invention is to provide an automatic travelling system of a construction vehicle in which a guide line is constituted by a laser beam.

To attain the primary object described above, in accordance with a first mode of the invention, there is provided an automatic travelling system of a construction vehicle characterised by comprising: a plurality of guide lines serving as a main traveling path means for a vehicle and disposed on a traveling road surface for the vehicle disposed between a raw material site and a raw material depot of a plant; and a plurality of detecting means provided on the vehicle so as to detect the guide lines.

In accordance with a second mode of the invention, there is provided an automatic travelling system of a construction vehicle wherein the detecting means in the above-described first mode of the invention comprises a plurality of guide line detectors disposed on a lower portion of a vehicle body of the vehicle at intervals with respect to each other in a perpendicular direction to that of a travelling direction, wherein any one of the detectors is arbitrarily selected for use.

To attain the second object described above, there is provided an automatic travelling system of a construction vehicle wherein the main travelling path means in accordance with the above-described first mode of the present invention is a main travelling path provided at a substantially central position between and in parallel with the raw material site and the raw material depot of the plant, and the plurality of guide lines are a plurality of laser beams respectively projected toward the main travelling path from a plurality of projectors disposed in the raw material site and the raw material depot of the plant, the guide line detecting means including an omnidirectional laser beam receiver mounted on the vehicle.

The above and other objects, modes and advantages of the present invention will become apparent to those skilled in the art from the following description in which preferred specific examples according to the principle of the present invention when taken in conjunction with the accompanying drawings.

BEST MODE FOR CARRYING OUT THE INVENTION

A description of the present invention will be given hereinunder in more detail with reference to the accompanying drawings.

The embodiments of the present invention are illustrated in FIGS. 2 to 10.

First, a first embodiment of the present invention will be described with reference to FIGS. 2 and 3.

Figure 2:
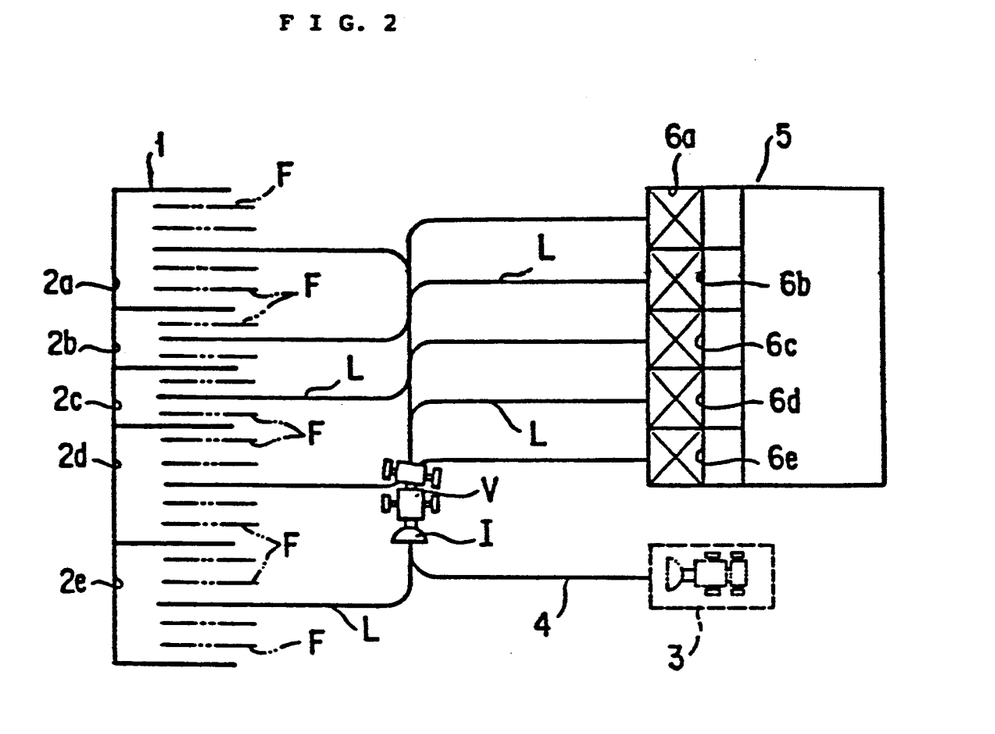
FIG. 2 is a schematic top plan view illustrating a first embodiment of the present invention applied to a plant site.

As shown in FIG. 2, a plurality of guide lines L are laid in correspondence with a plurality of raw material site sections 2a–2e of a raw material site 1 and a raw material depots 6a–6e of a plant 5, and these guide lines L serve as main travelling paths. Each of the raw material site sections 2a–2e is wider than the width of an operating bucket I of a construction vehicle V, and the construction vehicle V cannot uniformly take out the raw materials accommodated in the respective raw material site sections 2a–2e unless it is made to travel along each auxiliary travelling path F indicated by a two-doted-dash line in FIG. 2.

Figure 3:
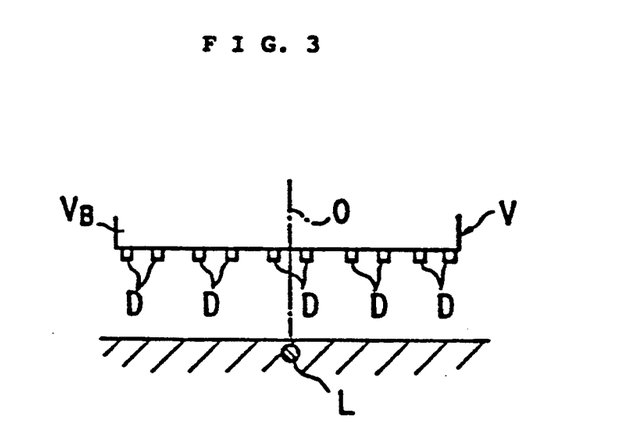
FIG. 3 is a schematic front view of an essential portion illustrating a state in which a detecting means used in the first embodiment shown in FIG. 2 is mounted on the vehicle.

For this reason, in the present invention, as shown in FIG. 3, a plurality of guide line detectors D are mounted on a vehicle body VB at intervals with respect to each other in a perpendicular direction to the travelling direction, and any one of the guide line detectors D is arbitrarily selected to that the selected guide line detector D is placed immediately above the guide line L.

As a means of selecting the guide line detector D, for instance, the operation is effected by selecting a travelling direction signal sent from the outside or a preprogrammed travelling direction signal, and the steering of the vehicle body 9 is controlled until the selected guide line detector D detects the guide line L.

Specifically, a main guide line detector D is mounted at a center O of the vehicle body, a plurality of auxiliary guide line detectors D are mounted on both sides thereof at the same intervals as those of the auxiliary travelling paths F. The changing-over operation is controlled in such a manner that, at the time of giving a normal travelling command, the main guide line detector D detects the guide line L, and when another travelling command is input, the auxiliary guide line detector D opposed to the auxiliary travelling path F designated detects the guide line.

It should be noted that reference numeral 3 in FIG. 2 denotes a waiting place for the construction vehicle, and 4 denotes a siding guide line to the waiting place.

Referring now to FIGS. 4 to 7, a description will be given of a second embodiment of the present invention.

Figure 4:
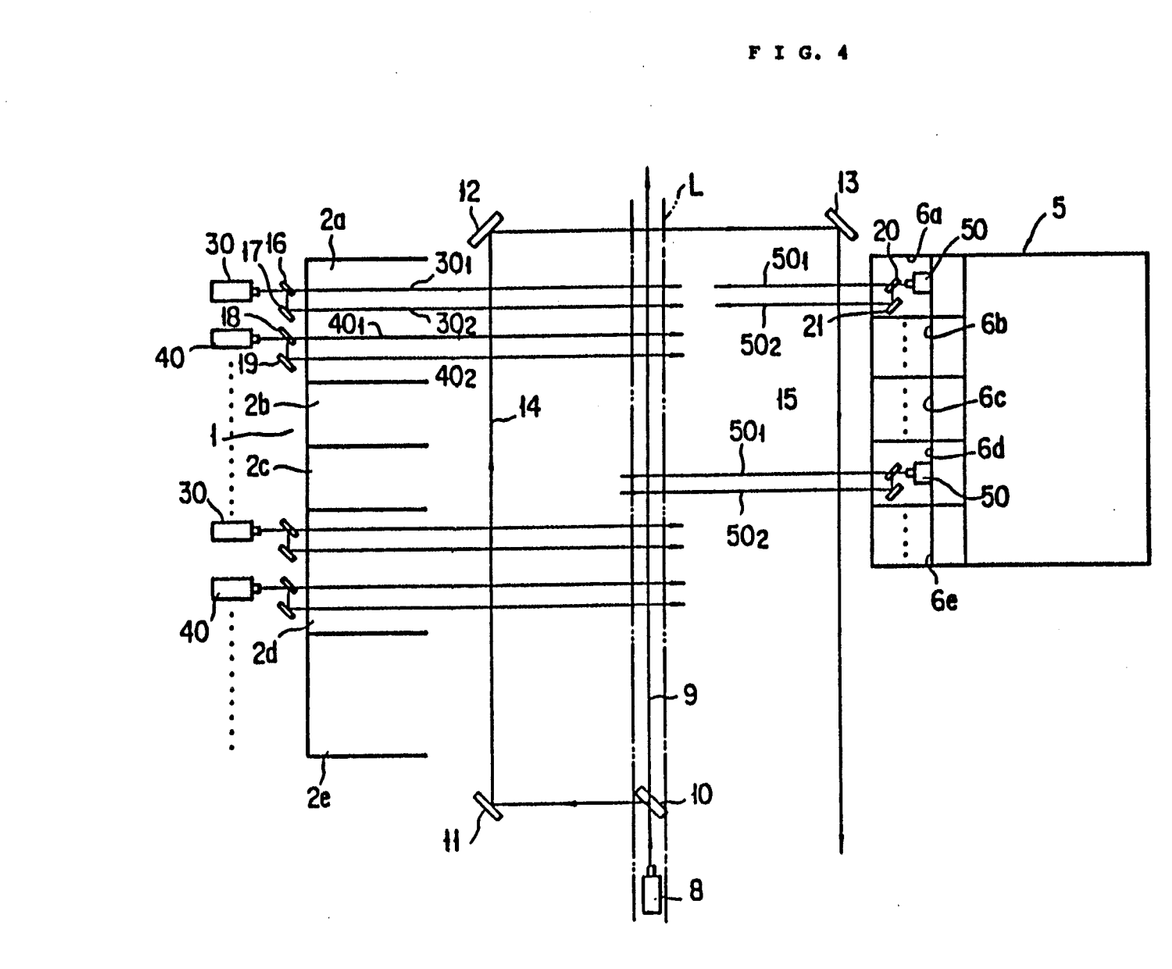
FIG. 4 is a schematic top plan view illustrating a second embodiment of the present invention applied to a plant site.

As shown in FIG. 4, first and second raw material site-side laser beam projectors 30, 40 are respectively installed on the plurality of raw material site sections 2a–2e of the raw material site 1, and plant-side laser beam projectors 50 are respectively installed on the raw material depots 6a–6e of the plant 5. A main travelling path L is provided at a substantially central position between and in parallel with the raw material site 1 and the plant 5, and a main laser beam 9 from, for instance, a main laser beam projector 8 is applied to the main travelling path L.

The main laser beam 9 is divided by half mirrors 10 and first, second and third half mirrors 11, 12, 13, and first and second auxiliary laser beams 14, 15 are applied to both sides of the main laser beam 9.

The laser beams from the first and second raw material site-side laser beam projectors 30, 40 are respectively divided into first, second, third, and fourth raw material site-side laser beams $30_1$, $30_2$, $40_1$, $40_2$ by means of half mirrors 16, 18 so as to intersect the main laser beam 9. At the same time, the laser beam from each plant-side laser beam projector 50 is also divided into first and second plant-side laser beams $50_1$, $50_2$ by a half mirror 20 and a mirror 21 so as to intersect the main laser beam 9.

Figure 5:
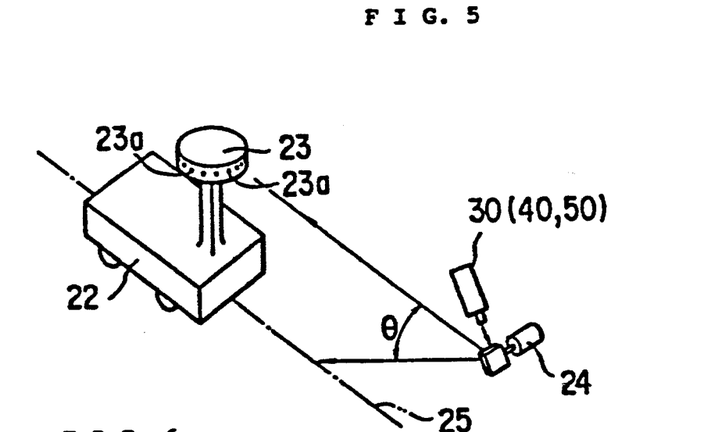
FIG. 5 is a schematic perspective view illustrating a state in which a laser beam is applied to the construction vehicle used in the second embodiment of the present invention.

As shown in FIG. 5, an omnidirectional laser beam receiver 23 is mounted on a construction vehicle 22 so as to receive the laser beam from each laser beam projector. The laser beam from each laser beam projector is oscillated vertically by a $\theta$ degree by a beam scanner 24, so that the laser beam can be received by the laser beam receiver 23 even if the surface of a travelling path 25 is uneven. The steering of the construction vehicle 22 is controlled in such a manner that a predetermined light-receiving element of light-receiving elements 23a of the laser beam receiver 23 receives the laser beam.

Figure 6:
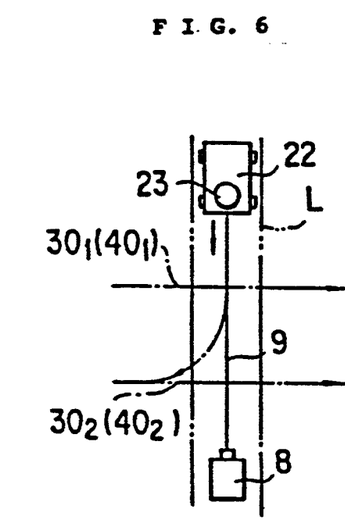
FIGS. 6 and 7 are schematic top plan views respectively explaining the operation of changing over the travelling direction of the vehicle concerning the second embodiment of the present invention.
Figure 7:
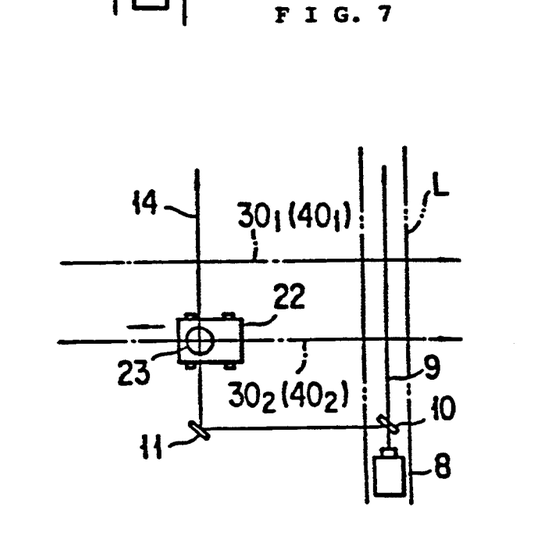

In addition, the construction vehicle 22 travels along the main laser beam 9. As shown in FIG. 6, if any selected one of the first laser beam 301 or 401 from the first raw material site-side laser beam projector 30 or the second raw material site-side laser beam projector 40 is received by the predetermined light-receiving element 23a of the laser beam receiver, the construction vehicle 22 swivels while being decelerated so as to receive the second laser beam 302 or 402, and the construction vehicle 22 travels toward any one of the raw material site sections along the second laser beam 302 or 402. As shown in FIG. 7, when the first auxiliary laser beam 14 is received by the light-receiving element 23a on the side surface of the laser beam receiver 23, the construction vehicle 22 stops and effects a leading operation in accordance with a predetermined loading program.

Upon completion of loading, the construction vehicle 22 travels backwardly along the second laser beam 302 or 402 and gets on the main travelling path L, and then travels along the main laser beam 9. When the first laser beam 501 of any selected one of the plant-side projectors 50 is received, the construction vehicle 22 swivels in the same way described above, gets on the second laser beam 502. When the second auxiliary laser beam 15 is received, the construction vehicle 22 stops in the same way as described above and effects an unloading operation.

Incidentally, if the laser beam receiver 23 does not receive any of the laser beams, it is judged that the vehicle 22 has deviated from a predetermined travelling course, and the construction vehicle is stopped. In addition, when any abnormalities or the like has occurred to the construction vehicle 22, the respective laser beam projectors are stopped, and the construction vehicle is brought to a standstill.

In addition, the reason why the two first and second raw material site-side laser beam projectors 30, 40 are installed in the raw material site sections is to prevent a drawback in that if the raw material side section is wide and if the construction vehicle 22 travels to one location only, the raw material in the remaining portion cannot be loaded.

Figure 8:
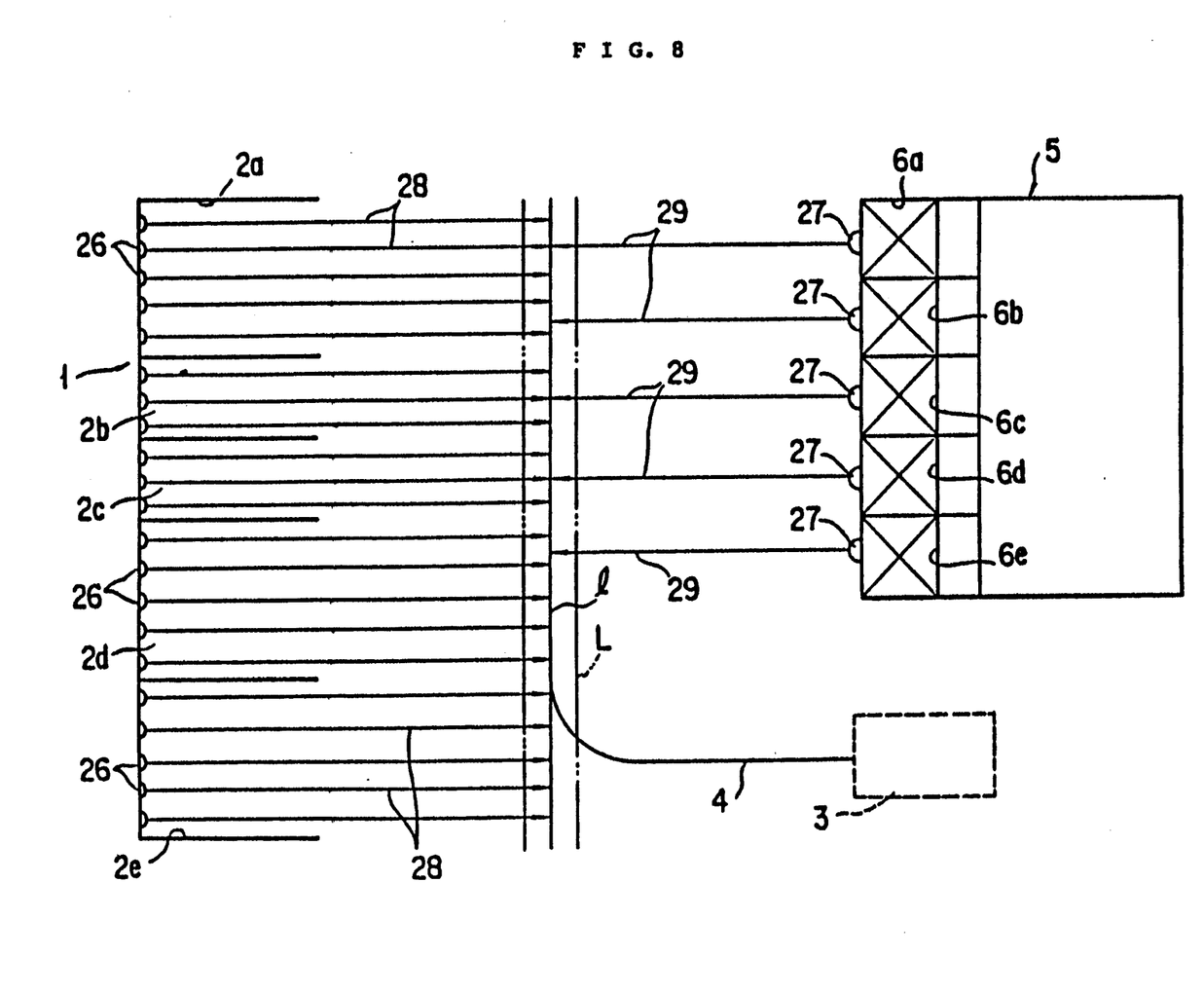
FIG. 8 is a schematic top plan view illustrating a modification of the second embodiment of the present invention shown in FIG. 4.
Figure 9:
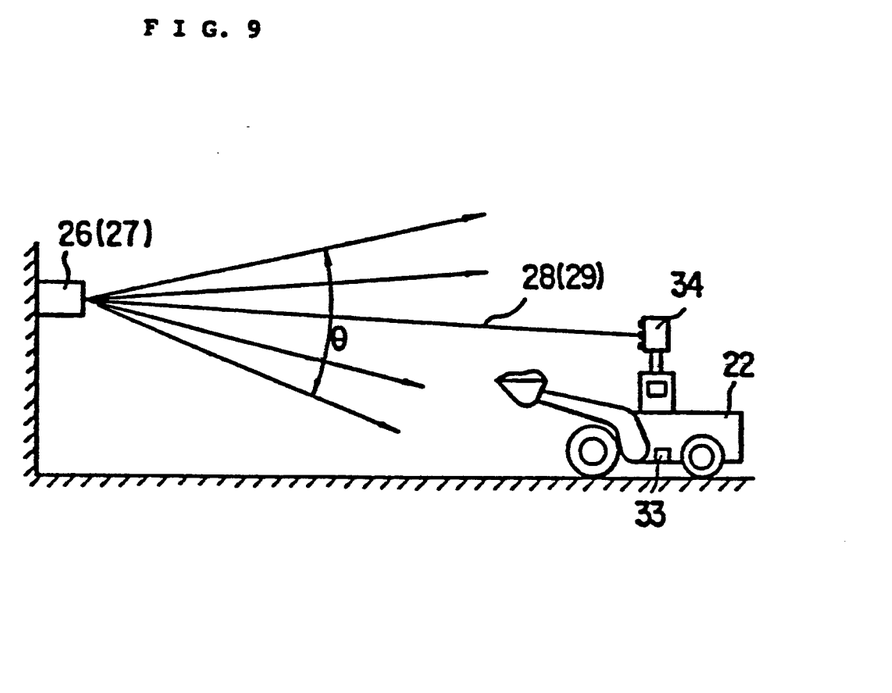
FIG. 9 is a schematic side-elevational view illustrating a state in which a laser beam is applied to the construction vehicle used in the modification shown in FIG. 8.

FIG. 8 illustrates a modification of a second embodiment of the present invention. A guide cable 1 is laid on the main travelling path L for the construction vehicle 20 between the raw material site 1 and the plant 5 as a main guide line, and light sources 26, 27 are provided in the respective raw material site sections 2a–2e and in the raw material depots 6a–6e. A light beam 28 or 29 of each light source 26 or 27 is projected in such a manner as to intersect the guide cable 1. As shown in FIG. 9, a guide cable detecting sector 33 and a beam receiver 34 are provided on the construction vehicle 22, and the light beam 28 or 29 from each light source 26, 27 is made to oscillate vertically by a θ degree to ensure that the light beam can be received by a beam receiver 34 even if the surface of the traveling path is uneven.

Figure 10:
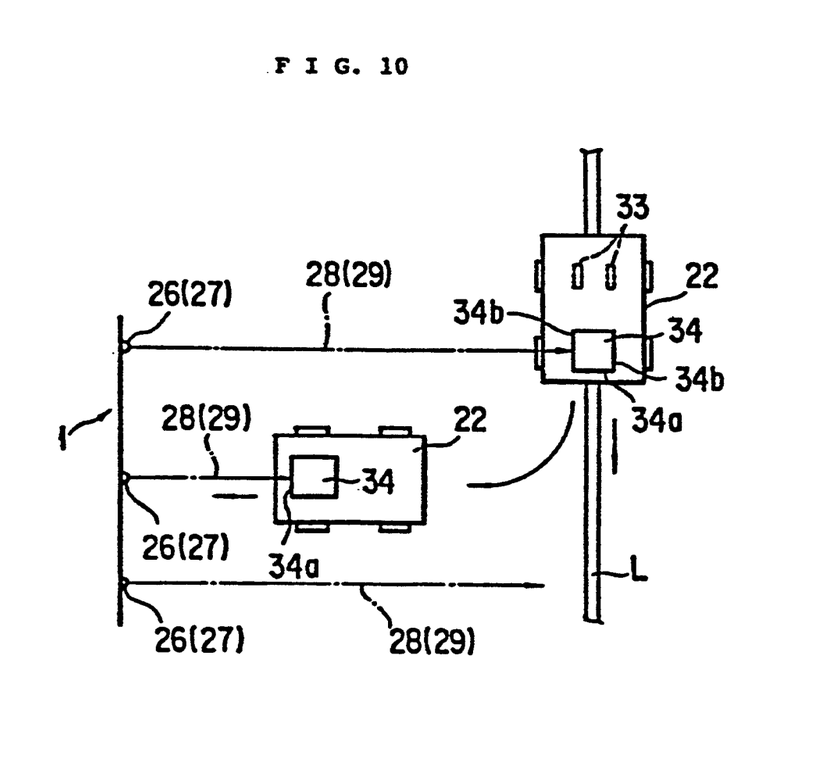
FIG. 10 is a schematic top plan view explaining the operation of changing over the travelling direction of the vehicle concerning the modification shown in FIG. 8.

In addition, as shown in FIG. 10, the beam receiver 34 is able to receive the light beam 28 or 29 at its front surface 34a and side surfaces 34b, 34b, and the construction vehicle 22 travels in such a manner that when the light beam 28 or 29 selected when the construction vehicle is travelling along the guide cable 1 is received at its side surface 34b, the construction vehicle 22 swivels and the front surface 34a receives the following light beam 28 or 29.

What is claimed is:

1. An automatic traveling system of a vehicle for navigating the vehicle from one of a plurality of starting points to one of a plurality of destination point along one of a plurality of predetermined traveling path defined between said starting points and said destination points, comprising:
   a plurality of primary guide line means defining respective of said traveling paths terminating at said starting points at one end and at said destination points at the other ends;
   a plurality of auxiliary guide line means defining auxiliary traveling path in a predetermined area in the vicinity of said destination points, said auxiliary guide line means defining approach paths for navigating said vehicle to an exact position to reach in said destination point;
   a first pair of detecting means arranged in alignment in a direction perpendicular to the traveling direction of said vehicle, said first pair of detecting means detecting said primary guide line for navigating the vehicular travel from selected one of said starting points to selected one of said destination points; and
   at least one second pair of detecting means arranged in alignment with the row of said first pair of detecting means, said second pair of detecting means detecting one of said auxiliary guide lines for selecting the approach path.

2. An automatic traveling system for a vehicle as set forth in claim 1, wherein said primary and auxiliary guide line means defines traveling lines on the ground, on which the vehicle travels.

3. An automatic traveling system for a vehicle as set forth in claim 1, wherein said first pair of detecting means are laterally symmetric position relative to the longitudinal axis of the vehicle and said at least one second pair of detecting means are arranged in lateral alignment with said first pair of detecting means in the position offset at one side of the longitudinal axis of the vehicle.

4. An automatic traveling system of a construction vehicle for navigating the vehicle from one of a raw material side having a plurality of raw material section to a plant having a plurality of raw material depots one of a plurality of predetermined traveling path defined between said raw material site and said plant, comprising:
   a plurality of primary guide line means defining respective of said traveling paths terminating at said row material site at respective one end and at said plant at respective of the other ends;
   a plurality of auxiliary guide line means defining auxiliary traveling path in a predetermined area in the vicinity of at least one of said raw material site and said plant, said auxiliary guide line means defining approach paths for navigating said vehicle to an exact position to reach;
   a first pair of detecting means arranged in alignment in a direction perpendicular to the traveling direction of said vehicle, said first pair of detecting means detecting said primary guide line for navigating the vehicular travel from selected one of said starting points to selected one of said destination points; and
   at least one second pair of detecting means arranged in alignment with the row of said first pair of detecting means, said second pair of detecting means detecting one of said auxiliary guide lines for selecting the approach path.

5. An automatic traveling system for a vehicle as set forth in claim 4, wherein said primary and auxiliary guide line means defines traveling lines on the ground, on which the vehicle travels.

6. An automatic traveling system for a vehicle as set forth in claim 4, wherein said first pair of detecting means are laterally symmetric position relative to the longitudinal axis of the vehicle and said at least one second pair of detecting means are arranged in lateral alignment with said first pair of detecting means in the position offset at one side of the longitudinal axis of the vehicle.

7. An automatic traveling system of a vehicle for navigating the vehicle from one of a plurality of starting points to one of a plurality of destination points along one of a plurality of predetermined traveling path defined between said starting points and said destination points, comprising:
   a plurality of first aerial guide line means for defining a plurality of first aerial guide lines respectively directed to a first direction essentially corresponding to a direction toward said destination points from said starting points, for navigating travel of said vehicle in the first direction;

at least one second aerial guide line means for defining at least one second aerial guide line intersecting with said first aerial guide lines perpendicularly to the latter for navigating travel of the vehicle in a second direction essentially transverse to said first direction;

at least one detector means mounted on the vehicle for detecting selected one of said first aerial guide lines and said second aerial guide line for selecting traveling path of the vehicle from selected one of said starting point and selected one of said destination point.

8. An automatic traveling system of a vehicle for navigating the vehicle from one of a plurality of starting points to one of a plurality of destination points along one of a plurality of predetermined traveling path defined between said starting points and said destination points, comprising:

a plurality of first aerial guide line means for defining a plurality of pairs first aerial guide lines respectively directed to a first direction essentially corresponding to a direction toward said destination points from said starting points, for navigating travel of said vehicle in the first direction;

at least one second aerial guide line means for defining at least one pair of second aerial guide lines intersecting with said first aerial guide lines perpendicularly to the latter for navigating travel of the vehicle in a second direction essentially transverse to said first direction;

at least one detector means mounted on the vehicle for detecting selected one pair of said first aerial guide lines and said pair of second aerial guide lines for selecting traveling path of the vehicle from selected one of said starting point and selected one of said destination point.

9. An automatic traveling system of a vehicle for navigating the vehicle from one of a plurality of starting points to one of a plurality of destination points along one of a plurality of predetermined traveling path defined between said starting points and said destination points, comprising:

a plurality of first aerial guide line means for defining a plurality of paris first optically perceptive aerial guide lines respectively directed to a first direction essentially corresponding to a direction toward said destination points from said starting points, for navigating travel of said vehicle in the first direction;

at least one second aerial guide line means for defining at least one pair of second optically perceptive aerial guide lines intersecting with said first aerial guide lines perpendicularly to the latter for navigating travel of the vehicle in a second direction essentially transverse to said first direction;

at least one detector means mounted on the vehicle for detecting selected one pair of said first aerial guide lines and said pair of second aerial guide lines for selecting traveling path of the vehicle from selected one of said starting point and selected one of said destination point.

10. A system as set forth in claim 8, wherein each of said first aerial guide line means and said second aerial guide line means includes a singular source of an aerial beam and means for separating said aerial beam for establishing said pair of aerial guide lines.

11. A system set forth in claim 7, wherein each of said guide lines is an optical beam.

12. A system as set forth in claim 11, wherein said optical beam is a laser beam.

13. A system as set forth in claim 12, wherein said laser beam is an omnidirectional laser beam.

14. A system as set forth in claim 9, wherein said aerial beam source is an optical light source emitting a light beam and said beam separating means is a deflector said light beam for establishing two light beams as said aerial guide beams.

15. An automatic traveling system of a vehicle for navigating the vehicle from one of a plurality of starting points to one of a plurality of destination points along one of a plurality of predetermined traveling path defined between said starting points and said destination points, comprising:

a plurality of primary guide line means defining respective of said traveling paths terminating at said starting points at one end and at said destination points at the other ends;

a plurality of auxiliary guide line means defining an auxiliary traveling path in a predetermined area in the vicinity of said destination points, said auxiliary guide line means defining approach paths for navigating said vehicle to an exact position to reach in said destination points;

a first pair of detecting means arranged in alignment in a direction perpendicular to the traveling direction of said vehicle, said first pair of detecting means detecting said primary guide line for navigating the vehicular travel from selected one of said starting points to selected one of said destination points; and a plurality of second pairs of detecting means arranged in row alignment with said first pair of detecting means, said second pair of detecting means detecting one of said auxiliary guide lines for selecting the approach path.

16. An automatic traveling system of a vehicle for navigating the vehicle from one of a plurality of starting points to one of plurality of destination points along one of a plurality of predetermined traveling paths defined between starting points and said destination points, comprising;

a plurality of first spacial guide line defining for defining a plurality of first spacial guide lines respectively directed to a first direction essentially corresponding to a direction toward said destination points from said starting points, for navigating travel of said vehicle in said first direction;

at least one second spacial guide line defining means for defining at least one second spacial guide line intersecting with said first aerial guide lines perpendicularly to the latter for navigating travel of the vehicle in a second direction essentially transverse to said first direction;

at least one detector means mounted on the vehicle for detecting selected one of said first spacial guide lines and said second spacial guide line for selecting the traveling path of the vehicle from selected one of said starting points to selected one of said destination points.

17. An automatic traveling system of a vehicle for navigating the vehicle from one of a plurality of starting points to one of a plurality of destination points along one of a plurality of predetermined traveling paths defined between said starting points and said destination points, comprising:

a plurality of primary guide line means defining respective of said traveling paths terminating at said starting points at one end and at said destination points at the other end;

at least one spatially extending auxiliary guide line defining means for defining at least one second spacial auxiliary guide line extending in a direction substantially perpendicular to said primary guide line means for navigating travel of the vehicle in a second direction essentially transverse to said primary guide line;

a first pair of detecting means arranged in alignment in a direction perpendicular to the traveling direction of said vehicle, said first pair of detecting means detecting said primary guide line for navigating the vehicular travel from selected one of said starting points to selected one of said destination points; and at least one detector means mounted on the vehicle for detecting selected one of said first spacial guide lines and said spacial auxiliary guide line for selecting the traveling path of the vehicle from selected one of said starting points to selected one of said destination points.

* * * * *